United States Patent [19]

Plantan

[11] Patent Number: 5,623,863
[45] Date of Patent: Apr. 29, 1997

[54] DUAL-THREAD RELEASE BOLT FOR SPRING BRAKE ACTUATOR

[75] Inventor: Ronald S. Plantan, Charlotte, N.C.

[73] Assignee: Indian Head Industries, Inc., Charlotte, N.C.

[21] Appl. No.: 581,120

[22] Filed: Dec. 29, 1995

[51] Int. Cl.$^6$ ............................................. F01B 7/00
[52] U.S. Cl. ............................................ 92/63; 92/130 A
[58] Field of Search ............................. 92/62, 63, 17, 92/130 A, 48

[56] References Cited

U.S. PATENT DOCUMENTS 3,131,609  5/1964  Dobrikin et al. ........................... 92/63

*Primary Examiner*—Thomas E. Denion
*Attorney, Agent, or Firm*—Howard & Howard

[57] ABSTRACT

A spring brake actuator includes a unique release bolt having two distinct threaded portions. A first-threaded portion is received in a threaded insert in the brake actuator outer housing. The second-threaded portion has its threads extending in an opposed direction to the first-threaded portion and is threadably received within a nut caging member. The nut is received in a bore in the push rod and constrained against rotation relative to the push rod. The nut moves axially within the push rod. The second-threaded portion rotates with the entire release bolt. When the release bolt is rotated, the first-threaded portion moves outwardly of the threaded insert, and the nut moves with the release bolt. At the same time, the second-threaded portion is rotating within the nut, and the nut moves axially relative to the second-threaded portion. The nut is moving axially due to two actions of the release bolt. Thus, movement of the release bolt outwardly of the brake actuator results in amplified movement of the caging member. In this way, the release bolt need not extend outwardly relative to the spring brake actuator housing as far as is the case with the prior art.

20 Claims, 3 Drawing Sheets

5,623,863

1

DUAL-THREAD RELEASE BOLT FOR SPRING BRAKE ACTUATOR

BACKGROUND OF THE INVENTION

This invention relates to a spring brake actuator wherein a release bolt moves a caging member within the emergency chamber an amplified amount for each unit of movement of the release bolt outwardly of the brake actuator chamber.

Spring brake actuators include an emergency or parking side enclosing a strong power spring. The power spring selectively actuates a push rod in the service side of the brake actuator. The service side is normally operated by air pressure to move the push rod and set the brake. Under certain conditions, the emergency side may actuate the push rod. One of those conditions is a failure in the brake air system. Upon a failure of the air system, the power spring expands and moves the push rod. The push rod sets the brake, preventing movement of the vehicle.

Under such conditions, a driver typically must cage the power spring to allow the vehicle to be moved. In the majority of the prior art brake actuators, a release bolt is associated with the spring brake actuator housing. The release bolt is moved into the emergency chamber and pulls a threaded plate outwardly to capture or cage the power spring. In addition to emergency situations, caging is utilized for shipment, repair, or other situations where the actuator is out of use for a period of time. Prior art release bolts have typically needed to extend outwardly of the housing a significant distance before beginning to cage the power spring.

In addition, so-called integral release bolts have been received in the brake actuator housing. Integral release bolts typically move outwardly of the housing a significant distance as they cage the power spring.

With both of these prior art caging systems, the release bolt must extend outwardly of the brake actuator a significant distance during caging of the power spring. Brake actuators are typically mounted beneath vehicles, and are often in a crowded space. The mounting of the brake actuator relative to other structure on the vehicle is such that there may not be enough room for the release bolt to extend outwardly of the brake actuator the necessary distance.

SUMMARY OF THE INVENTION

In a disclosed embodiment of this invention, a spring brake actuator is provided with a release bolt that is received within the emergency chamber at all times. To cage the power spring, the release bolt is moved outwardly of the brake actuator housing. A caging member moves upon movement of the release bolt to actually cage the power spring. The movement of the caging member is amplified relative to movement of the release bolt. Thus, the release bolt need not move as far outwardly of the brake actuator housing as is required with the prior art. Instead, only a small movement of the release bolt outwardly of the housing is necessary. The amplified movement of the caging member fully cages the power spring. Thus, less room is required outwardly of the spring brake actuator housing.

In a preferred embodiment of this invention, the release bolt turns within a threaded insert in an outer housing, and moves outwardly by turning within the threaded insert. An outer section of the release bolt received within the threaded member has its threads extending in a first direction. An inner section of the release bolt has threads extending in a direction opposed to the first direction. This inner section is threadably received within a caging member. The caging member is most preferably a nut. The nut slides within the inner periphery of an emergency side push rod and captures the actuator member for the brake actuator to cage the power spring when the nut is pulled outwardly. The basic concept of a release bolt turning such a nut is disclosed in pending U.S. patent application Ser. No. 08/5 15,239, filed Aug. 15, 1995, owned by the Assignee of the present invention, and naming one co-inventor.

The inventive dual thread release bolt need only move outwardly of the brake actuator outer housing a small distance. The nut is pulled with the release bolt during this outward movement. At the same time, the inner section of the bolt is turning within the nut. During this turning, the nut moves axially and slides relative to the push rod. Thus, the movement of the nut not only occurs directly with movement of the release bolt outwardly of the housing, but also additional movement of the nut relative to the release bolt occurs when the inner section of the release bolt is turned within the nut. This is the amplification discussed above.

These and other features of the present invention will be best understood from the following specification and drawings, of which the following is a brief description.

DETAILED DESCRIPTION OF A PREFERRED EMBODIMENT

Figure 1:
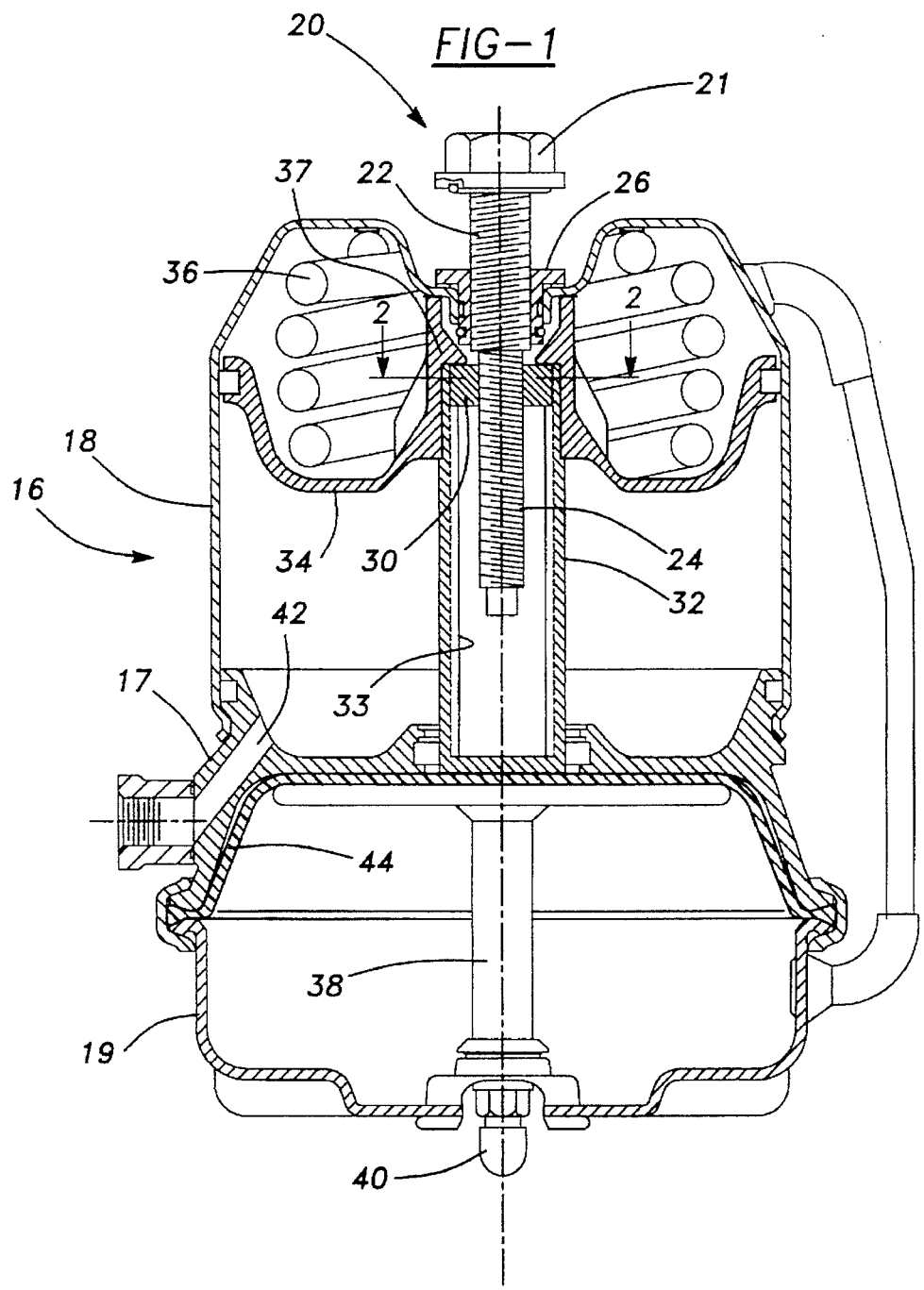
FIG. 1 is a cross-sectional view through a spring brake actuator incorporating the present invention.

FIG. 1 shows a spring brake actuator 16 incorporating a center housing 17 connected to an outer housing 18. An emergency chamber is defined between housings 17 and 18. A service chamber housing 19 is also connected to the center housing 17. A service chamber is defined between housings 17 and 19. A release bolt 20 includes a head 21, and a first-threaded portion 22. A second-threaded portion 24 is positioned axially inwardly of first-threaded portion 22. As shown, first-threaded portion 22 has its threads extending in a first direction, while second-threaded portion 24 has its threads extending in a opposed direction. As an example, first-threaded portion 22 may have right-hand threads, while second-threaded portion 24 may have left-hand threads. As also shown, second threaded portion 24 has a smaller outer diameter than first-threaded portion 22. First-threaded portion 22 is threadably received within threaded insert 26. When bolt head 21 is turned, the threads on portion 22 turn relative to threaded insert 26, and bolt 20 moves inwardly or outwardly of the housing 18. At the same time, second-threaded portion 24 turns within nut 30. Nut 30 slides within push rod 32. The inner periphery of the bore 33 in push rod 32 conforms to the outer periphery of nut 30. Thus, nut 30 is constrained against rotation within push rod 32, but may slide axially within the push rod 32.

An actuator member 34, here a piston, captures the power spring 36. The nut 30 contacts a ledge 37 on actuator 34 to capture and hold the power spring 36. In this position, the power spring is "caged." That is, the power spring cannot expand to move the push rod 32 outwardly against the service chamber push rod 38. As is known, when push rod 38 moves outwardly, it moves a member 40 which is connected to a brake mechanism to set the brake. Air port 42 supplies pressurized air to the area beneath the actuator member 34. In the absence of the caging bolt 20, air pressure will hold the actuator member 34 upwardly, preventing expansion of the spring 36. However, in absence of that air pressure, the spring 36 is otherwise free to expand downwardly and actuate the brake. Release bolt 20 functions to prevent such expansion.

A diaphragm 44 is received between housings 17 and 19, and the operation of the brake normally proceeds by supplying air above the diaphragm 44 to control movement of the push rod 38. Upon certain known conditions, the power spring 36 moves push rod 32 to actuate the push rod 38.

Figure 2:
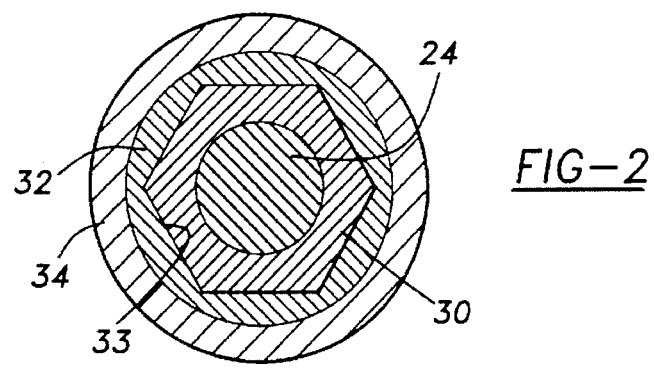
FIG. 2 is a cross-sectional view along line 2—2 as shown in FIG. 1.

As shown in FIG. 2, the bore 33 has an inner periphery that corresponds to the outer periphery of the nut 30. Thus, the nut 30 is constrained against rotation relative to the push rod 32, but is free to slide axially within the push rod 32. In practice, there may be some clearance between the two members, however, it is important to constrain relative rotation. Moreover, the outer periphery of the nut 30 may be different from that shown. The main function is that the outer periphery of the nut 30 interact with the inner periphery of bore 33 such that rotation is prevented.

Figure 3:
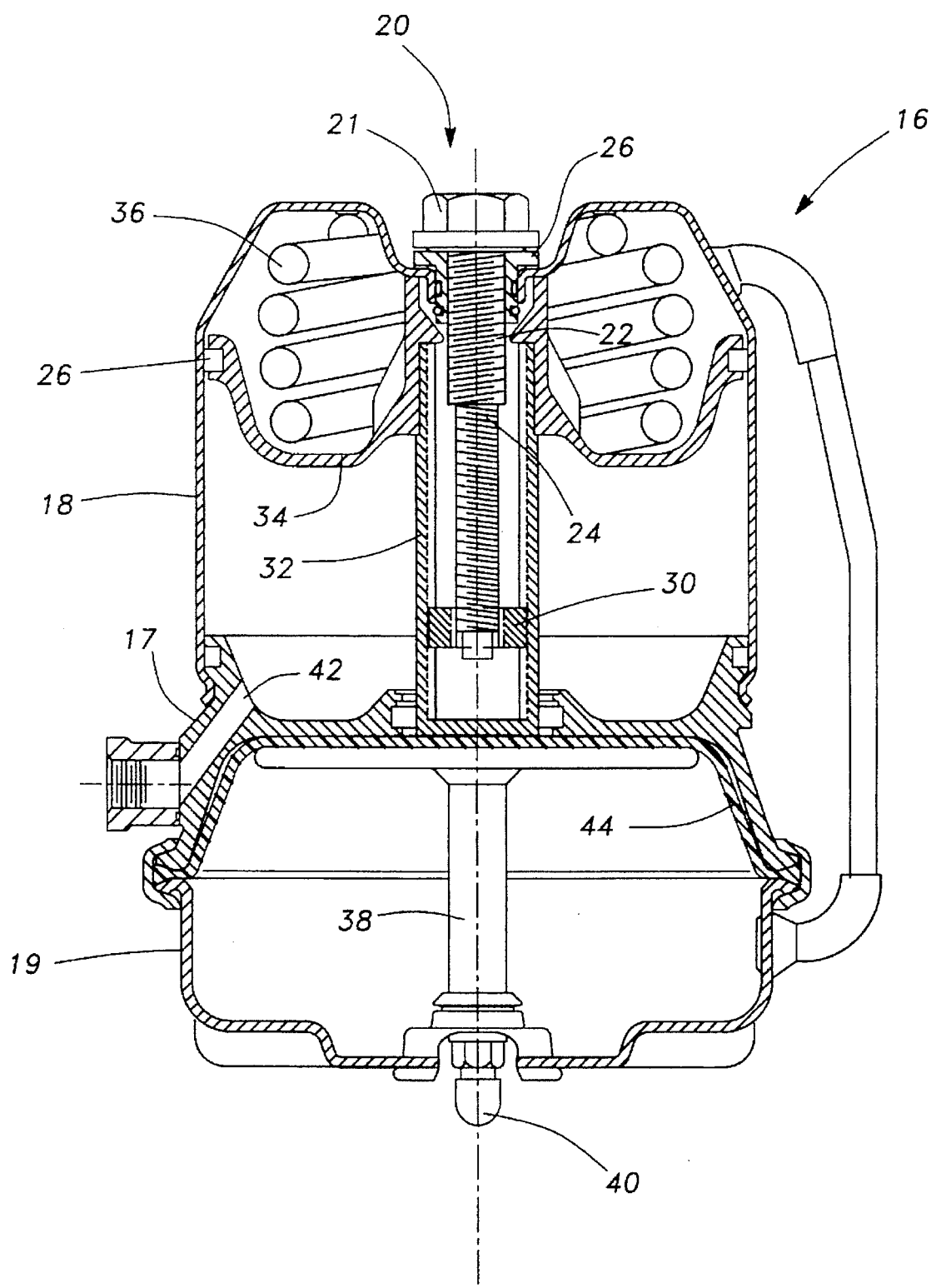
FIG. 3 is a cross-sectional view through the spring brake actuator as shown in FIG. 1 in a distinct position.

As shown in FIG. 3, bolt 20 has now been moved to an uncaged position. One knows when the bolt 20 has been fully released, since the bolt head 21 will be all the way down against the insert 26. The power spring 36 is now free to expand and move the actuator member 34 downwardly. The brake actuator 16 is shown with air pressure holding the actuator member upwardly. It should be noted that although actuator member 34 is shown as a piston brake actuator, it may also be a diaphragm. The main aspects of this invention extend to the release bolt, rather than to details of the brake actuator itself.

Figure 4:
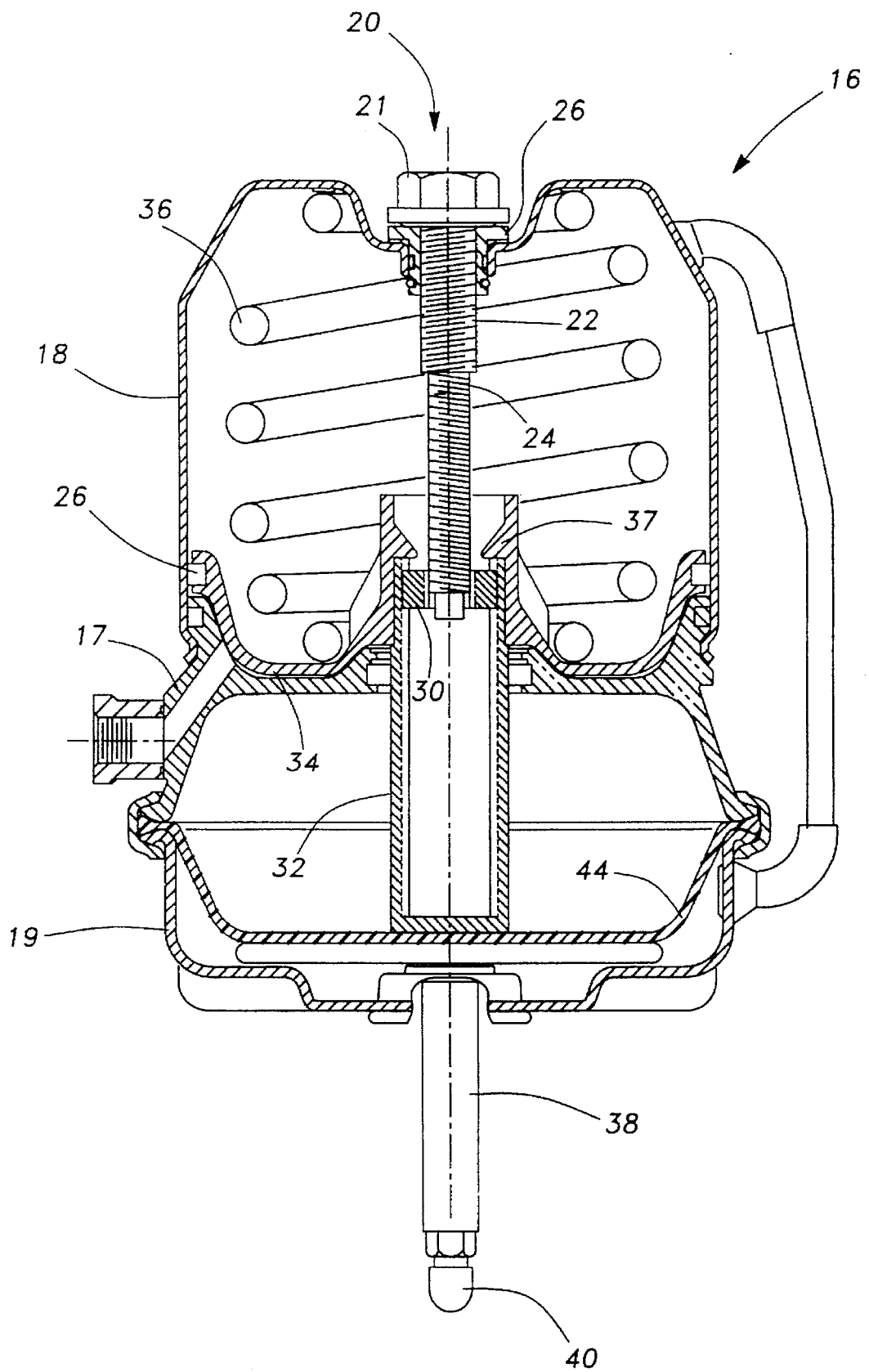
FIG. 4 shows yet another position of the spring brake actuator of FIG. 1.

As shown in FIG. 4, with the release bolt in the uncaged position, the actuator member 34 can move downwardly when the power spring 36 expands. This same movement would have been prevented with the release bolt 20 in the position shown in FIG. 1. The movement between FIGS. 3 and 4 will occur if the air pressure is disconnected to set the parking brake or if the air system fails.

With the spring brake actuator 16 in the position shown in FIG. 4, one may wish to cage the actuator member 34 and power spring 36. Caging is accomplished by turning release bolt head 21. As first-threaded portion 20 rotates within threaded insert 26, the release bolt moves outwardly of the housing 18. At the same time, second-threaded portion 24 is turning within nut 30. Nut 30 is received on, and moves axially with, second-threaded portion 24, but also turns relative to the second-threaded portion 24. As the entire bolt 20 moves outwardly, the nut 30 also moves outwardly. However, at the same time, as the bolt 24 turns within nut 30, nut 30 moves axially along the bolt.

Thus, upon turning of bolt head 21, nut 30 is pulled outwardly with movement of the entire bolt, but also turns relative to second-threaded portion 24 and, thus, moves axially along the bolt 24. As such the nut 30 moves a greater axial distance than bolt 20. As shown in FIG. 4, the nut 30 is near the bottom of the threaded portion 24, while in the caged position shown in FIG. 1, it is near the top. Due to this amplification of movement of the nut 30, the release bolt need only move a small amount outwardly of the housing member 18. Thus, the spring brake actuator 16 may be utilized in a relatively tight environment.

A preferred embodiment of this invention has been disclosed, however, a worker of ordinary skill in the art would recognize that certain modifications would come within the scope of this invention. For that reason, the following claims should be studied to determine the true scope and content of this invention.

I claim:

1. A spring brake actuator comprising:

a central housing defining an aperture for passage of a push rod;

a push rod selectively extending through said aperture;

an outer housing connected to said central housing to define an emergency chamber;

an actuator member moving with said push rod;

a power spring selectively moving said actuator member and said push rod outwardly of said aperture;

a release tool for selectively caging said power spring and preventing movement of said power spring to move said push rod through said aperture, said release tool being movable between fully caged and fully released positions, said release tool moving a caging member within said emergency chamber to cage said power spring, and said release tool being operable such that upon movement of said release tool axially outwardly of said outer housing, the resulting movement of said caging member is amplified to be greater than the movement of said release tool such that said release tool need not move outwardly of said housing a large amount.

2. A spring brake actuator as recited in claim 1, wherein said release tool is a bolt and said caging member is a nut which is threadably received on an inner threaded portion of said release bolt.

3. A spring brake actuator as recited in claim 2, wherein said release bolt has an outer threaded portion wherein said threads extend in a first direction received in a threaded insert in said outer housing, and said inner threaded portion having its threads extending in a distinct direction to said first direction.

4. A spring brake actuator as recited in claim 3, wherein said nut is received within a bore in said push rod, said nut being constrained against rotation relative to said push rod, but being free to move axially within said push rod.

5. A spring brake actuator as recited in claim 4, wherein said inner threaded portion has an outer diameter that is less than said outer threaded portion.

6. A spring brake actuator as recited in claim 5, wherein said actuator member is a piston.

7. A spring brake actuator as recited in claim 3, wherein said inner threaded portion has a smaller outer diameter than said outer threaded portion.

8. A spring brake actuator as recited in claim 1, wherein said caging member is received within a bore in said push rod, said caging member being constrained against rotation relative to said push rod, but being free to move axially within said push rod.

9. A spring brake actuator comprising:

a central housing defining an aperture for passage of a push rod;

a push rod selectively extending through said aperture;

an outer housing connected to said central housing to define an emergency chamber;

an actuator member moving with said push rod;

a power spring selectively moving said actuator member and said push rod outwardly of said aperture;

a release bolt for selectively caging said power spring and preventing movement of said power spring to move said push rod through said aperture, said release bolt being movable between fully caged and fully released positions, said release bolt extending outwardly of said outer housing between said fully released and said fully caged positions, said release bolt having two threaded portions, with a first-threaded portion being received in a threaded insert in said outer housing, and a second-threaded portion positioned axially inwardly frown said first threaded portion, said second-threaded portion being threadably received in a caging member, the threads on said first and second portions extending in opposed directions, such that upon rotation of said release bolt, said release bolt moves outwardly of said outer housing due to rotation in said threaded insert, and said caging member being received on said second threaded portion and moving axially outwardly with said release bolt during this movement, and rotation of said second-threaded portion within said caging member also causing axially outward movement of said caging member.

10. A spring brake actuator as recited in claim 9, wherein said caging member is a nut.

11. A spring brake actuator as recited in claim 10, wherein said nut is received within a bore in said push rod, said nut being constrained against rotation relative to said push rod, but being free to move axially within said push rod.

12. A spring brake actuator as recited in claim 11, wherein said first threaded portion has a greater outer diameter than said second threaded portion.

13. A spring brake actuator as recited in claim 12, wherein said actuator member is a piston member.

14. A spring brake actuator as recited in claim 11, wherein said nut selectively contacts a ledge on said actuator member to move said actuator member and cage said power spring.

15. A spring brake actuator as recited in claim 9, wherein said caging member contacts a ledge on said actuator member to move said actuator member and cage said power spring.

16. A spring brake actuator as recited in claim 9, wherein said first threaded portion has a greater outer diameter than said second threaded portion.

17. A spring brake actuator comprising:

a central housing defining an aperture for passage of a push rod;

a push rod selectively extending through said aperture;

an outer housing connected to said central housing to define an emergency chamber;

an actuator member moving with said push rod;

a power spring selectively moving said actuator member and said push rod outwardly of said aperture;

a release bolt for selectively caging said power spring and preventing movement of said power spring to move said push rod through said aperture, said release bolt being movable between fully caged and fully released positions, said release bolt extending outwardly of said outer housing a first distance between said fully released and said fully caged positions, said release bolt having two threaded portions, with a first-threaded portion being received in a threaded insert in said outer housing, and a second-threaded portion positioned axially inwardly from said first threaded portion, said second-threaded portion being threadably received in a caging member, the threads on said first and second portions extending in opposed directions, such that upon rotation of said release bolt, said release bolt moves outwardly of said outer housing due to rotation in said threaded insert, and said caging member being received on said second threaded portion and moving axially outwardly with said release bolt during this movement, and the rotation of said second-threaded portion within said caging member also causing axially outward movement of said caging member, the combined movements causing said nut to move through a second distance, said second distance being greater than said first distance.

18. A spring brake actuator as recited in claim 17, wherein said nut is constrained against rotation in said push rod.

19. A spring brake actuator as recited in claim 17, wherein said first threaded portion has a greater outer diameter than said second threaded portion.

20. A spring brake actuator as recited in claim 17, wherein said actuator member is a piston.

* * * * *